PROCESS FOR ELECTRICAL RESISTANCE-WELDING OF OVERLAPPING SHEETS

Filed July 5, 1968 4 Sheets-Sheet 1

INVENTORS
KARL HEINRICH TAPPOLET
ALFRED GERSPACHER
BY
Woodhams, Blanchard & Flynn
ATTORNEYS

PROCESS FOR ELECTRICAL RESISTANCE-WELDING OF OVERLAPPING SHEETS

INVENTORS
KARL HEINRICH TAPPOLET
ALFRED GERSPACHER
BY
Woodhams, Blanchard & Flynn
ATTORNEYS

PROCESS FOR ELECTRICAL RESISTANCE-WELDING OF OVERLAPPING SHEETS

Filed July 5, 1968 4 Sheets-Sheet 3

INVENTORS
KARL HEINRICH TAPPOLET
ALFRED GERSPACHER
BY
Woodhams, Blanchard & Flynn
ATTORNEYS

PROCESS FOR ELECTRICAL RESISTANCE-WELDING OF OVERLAPPING SHEETS

Filed July 5, 1968 4 Sheets-Sheet 4

INVENTORS
KARL HEINRICH TAPPOLET
ALFRED GERSPACHER
BY
Woodhams, Blanchard & Flynn
ATTORNEYS

1

3,495,065

PROCESS FOR ELECTRICAL RESISTANCE-WELDING OF OVERLAPPING SHEETS

Karl H. Tappolet and Alfred Gerspacher, Zurich, Switzerland, assignors to Firma Tagers G.m.b.H., Zurich, Switzerland, a corporation of Switzerland Continuation-in-part of applications Ser. No. 423,394, Jan. 4, 1965, and Ser. No. 522,578, Jan. 24, 1966. This application July 5, 1968, Ser. No. 742,795
Int. Cl. B23k *1/16, 11/30*
U.S. Cl. 219—64 21 Claims

ABSTRACT OF THE DISCLOSURE

An electrical resistance process and apparatus for forming a welded seam between metal sheets having the edges thereof bent and positioned to overlap one another. The overlapped edges are positioned between a pair of electrodes which extend lengthwise of the seam to be welded, which electrodes pass current through the edges to produce the welded seam. The overlapped edges have their adjacent surfaces held in positive abutting contact with each other by suitable means.

CROSS REFERENCE TO RELATED APPLICATIONS

This application is a continuation-in-part of our copending applications Ser. Nos. 423,394 and 522,578, filed Jan. 4, 1965, and Jan. 24, 1966, respectively, both now abandoned.

FIELD OF THE INVENTION

The invention relates to electrical resistance welding and provides a process and apparatus applicable to the welding of quantity-produced articles of thin sheet metal such as sheet steel, tin-plated sheet steel, or aluminium. It relates more particularly to the welding of a body seam in containers, for example tins or cans for food, by a process in which the body seam is situated between a pair of electrodes.

BACKGROUND OF THE INVENTION

Body seams in cylindrical containers have hitherto been produced by means of welding machines whose welding speed is not equal to that of conventional tin soldering machines or manufacturing equipment. The known processes, for example roller welding, are undesirable since the welds are often faulty, the surfaces of the container metal at the seam are often damaged, and the electrodes become alloyed.

This invention relates to a process for electrical resistance-welding of overlapping sheets, especially tinned steel sheets, in which the ends of the two sheets are bent up and then laid over one another and fastened together at the bends by means of two welding electrodes extending along the whole length of the seam. In a known process of this type an increased resistance is supposed to be produced to achieve a concentrated heating by round bending of the sheet edges, whereby the sheets overlap over a large width and consequently the ends of the sheet touch each other only at the edges of the two bendings. Thus, in this previously-known process only a doubled line contact exists so that an exceptionally high current density is provided at the bent edges, which results in a very strong local heating on the passage of the current. However, in the welding of relatively thin tinned sheets, such as are required for the production of tin cans, this welding heat arising at the edges permeates through the sheet so that melting of the tin occurs on the outer faces of the sheets lying adjacent the bent edges. Not only does this result in damage to the sheet at the welding seam

2 but also the molten tin diffuses into the welding electrode so that the contact resistance of the electrodes is altered. The contact resistance thereby varies or becomes irregular. In consequence, the material being welded is burnt or insufficiently welded.

In the above-mentioned process, two welding seams are formed. However, it is very difficult to produce two secure and leakproof welding seams since it is practically impossible to cause the pressure applied by the welding electrodes to press with exactly equal magnitudes on the two bent edges. It must also be taken into consideration that these two edges, which are produced by a cutting and bending operation, do not form an exact straight line so that these edges lie against the adjacent sheet in an irregular manner and abut or contact the opposite sheet only at some places. There is thus an uneven contact resistance along this edge or at both edges so that considerable variations occur in the current flow through the edges. Thus, an uneven welding occurs along one or both edges. Accordingly, with this previously-known process, no secure and leakproof welded connection can be produced.

It is an object of the present invention to obviate the above-mentioned disadvantages.

According to the invention, body edges which are to be welded together are set at an angle or bent in relation to one another, more particularly approximately at right-angles, whereupon at least one outer electrode occupying a specific area and possibly adapted to the shape of the body is pressed against the body seam preferably so as to overlap the bent edges whereupon the seam is subjected via these electrodes to current pulses along its length. The height of the bent edge should be at least equal to the thickness of one sheet.

It has been found that important improvements are obtained in this way and in particular the seam is air-tight over the entire body length, any tin-plating being practically undamaged while the working speed is increased many times.

The process according to the invention further gives the optimum relationship for the contact resistances between the electrode and the material undergoing welding and between the contact surfaces of the developed cut edges to the opposite metal surface.

More specifically, in order to avoid the above-mentioned disadvantages, in the process according to this invention the ends of the sheets are turned up approximately at right-angles to a height at least equal to the sheet thickness. The facing sides of the two upturned edges are then pushed or pulled together with a pressure directed transversely to the electrode pressure, whereupon while this pressure is maintained the current impulse required for the production of the welding heat is passed through the ends of the sheets by means of the electrodes and finally the ends of the sheets are fastened together by press-welding by further pressure of the electrodes. In this it is of advantage if the ends of the sheets are turned up exactly at right angles.

This new process differs essentially from the above-mentioned known process, since in the process in accordance with the invention the facing sides or surfaces of the upturned edges are pressed together to form a positive connection so that a significant reduction of resistance for the current impulse results from this surface contact, especially with tinned steel sheets, since the sheet ends turned up at an angle engage one another at a contact surface coated with tin. The current density is thereby significantly reduced or evenly spread over this contact surface. As a result the welding heat flowing from this contact surface during the welding operation does not take effect on the outer side of the sheet and accordingly the tin on this outer surface does not melt. Thus, there is here neither damage to the weld seam nor a disadvantageous alteration of the welding electrodes by diffusing tin.

Since in this new welding process there is a contact surface determined by the height of the upturned edge, in all weldings a uniform current path is produced along the length of the weld seam so that any variation in the current flow is very small. While in the above-mentioned process there are two weld seams, the process in accordance with this invention produces a secure and leakproof welded connection having only a single weld seam. In the new process there is further only a small overlap of the two ends of the sheets. This has the advantage over the previously-known process of not only saving material but also forms only a localized and insignificant thickening. With a can body produced by the process in accordance with the present invention, the bottom and lid can be fastened or rabbeted without any special measures (no cutting away of the rabbet seam or weld seam are necessary).

The details of the process and apparatus according to the invention are more fully explained hereinbelow.

DETAILED DESCRIPTION

Figure 1:
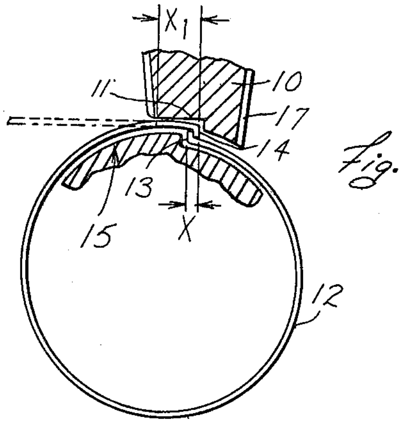
FIGURE 1 is a side view of one embodiment of the apparatus and process according to the present invention.
Figure 2:
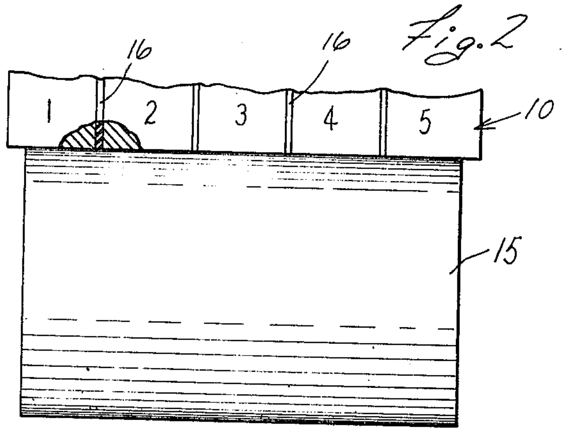
FIGURE 2 is a front elevation of the electrodes of the apparatus shown in FIGURE 1.

Referring to FIGURES 1 and 2, an outer electrode 10 is constructed as a beam terminating in a surface 11. The edges 13, 14 of a sheet metal container body 12 are advantageously so set at an angle that said edges 13, 14 form a positive connection therebetween, the connection being formed by positioning the adjacent faces of the edges 13, 14 in abutting contact with each other as is clearly shown in FIGURES 1 and 3. The edges are shown bent at an angle of approximately 90° and overlap by a distance equal to the thickness of the sheet metal. An inner contact electrode 15 is introduced into the container body 12. The broken lines illustrate part of the container body in a horizontal position to show that a larger illustration shows surface contact between the surface 11 of the electrode 10 and the container body or body edges 13, 14. FIGURE 1 also shows that the contacting surfaces of the electrodes 10 and 15 are stepped to accommodate the bent edges 13 and 14.

FIGURE 2 is a front elevation of the two electrodes. The outer electrode 10 may, if desired, be formed of sections 1 to 5 separated by at least one layer of varnish or oxide 16 to prevent any short-circuit between the electrodes 10 and 15 in the transverse direction (horizontally in FIGURE 2). Current pulses are passed to the electrode sections by control means (not shown) and can follow one another successively. The pulse interval may, for example, be 1/100 of a second. The pulse sequence need not necessarily be just 1, 2, 3 but may be 2 and simultaneously 1, 3. It has been found advantageous to pulse the current to the electrode sections in the following sequence:

| | |
|---|---|
| I | 3 1 5 2 4 |
| II | 1 5 3 4 2 |
| III | 2 4 1 5 3 |
| IV | All together |

Short-circuits can, however, usually be prevented without the layer of varnish, by suitable timing, taking into account thermal conductivity, electrical conductivity and the shape of the electrodes and container body.

In an example, the selections of electrode 10 were made 25 mm. wide and the layer of varnish 16 equal to about $10\mu$. If an oxide layer is used the layer may be $12\mu$.

A further feature of the invention (FIGURE 1) comprises providing a specific value for the contact area ratio. This term is used to denote the ratio $x:x_1$, i.e., the ratio of the thickness of the bent edges of the container body to the contact area of the electrode 10 in the region of the body seam. If, for example, the thickness of the sheet metal is 0.28 mm., the value $x$ is 0.56 mm. and the value $x_1$ is 11.4 mm. so that $x_1=20x$.

The electrode 10 may be provided with cooling ribs, such as the radial cooling ribs 17. This provides better control of thermal conductivity or more accurate control of the heat required at the edges of container body.

Figure 3:
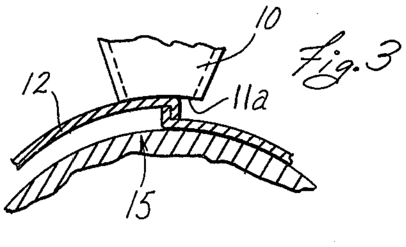
FIGURE 3 is a side view of a modification of the apparatus illustrated in FIGURE 1.

In the embodiment shown in FIGURE 3 the contact surface **11*a* of the electrode 10 is curved, preferably to the same curvature as the container body 12**.

As will also be apparent from FIGURE 2, a slight overlap of the electrode 10 is advantageous.

Figures 4, 8:
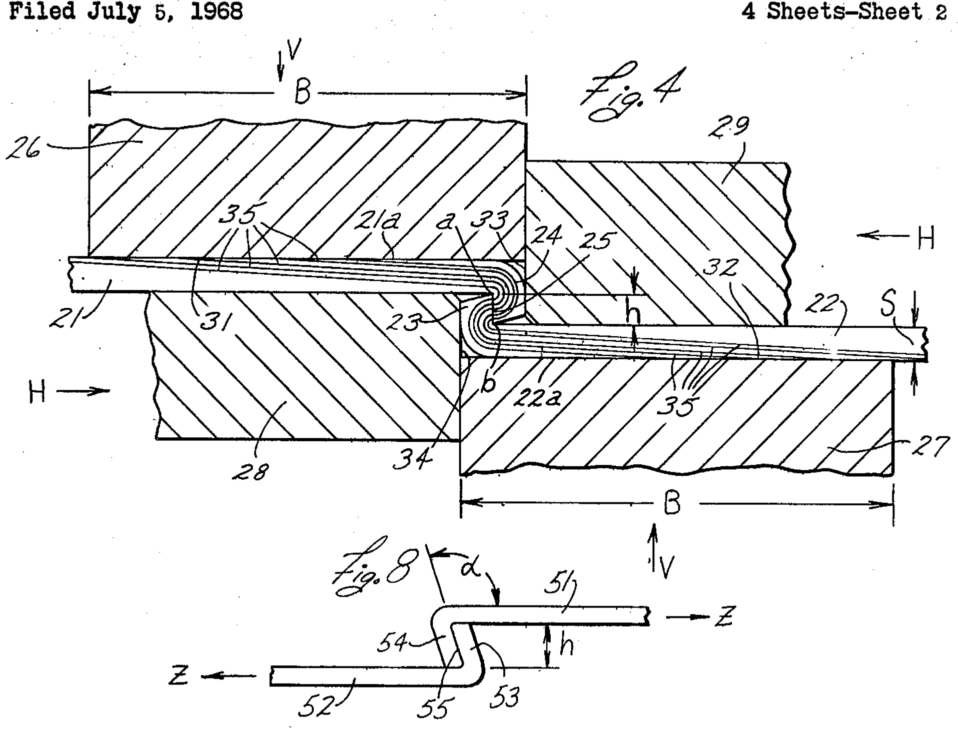
FIGURE 4 schematically illustrates in cross section a modified resistance-welding apparatus according to the present invention.
FIGURES 8 and 9 illustrate a further embodiment of the welding process of the invention in two different operating positions and on an enlarged scale.

FIGURE 4 illustrates a modified process and apparatus and wherein two sheet ends 21 and 22 are provided with turned-up edges 23 and 24. The height $h$ of these turned-up edges corresponds closely to the thickness $s$ of the sheet. The sheet edges are advantageously turned up to a height $h$ which is greater than the sheet thickness $s$. As the process in accordance with the invention is principally intended and suitable for the welding of can bodies produced from tinplate, in this case the two parts 21 and 22 represent the two ends of a strip formed into a cylindrical can body, whose upturned edges 23 and 24 are to be welded together. Since following the process in accordance with the invention these upturned edges 23 and 24 must have their sides or surfaces which are turned toward one another pressed together at contact surface 25, the sheet ends 21 and 22 are advantageously bent up sharply at right angles, as shown.

The welding apparatus illustrated in FIGURE 4 consists generally of two welding electrodes 26 and 27 arranged opposite one another, but displaced or shifted sideways, at times touching the sheet ends 21 and 22 over the greater breadth B, and extending up to the upturned edges 23 and 24, and of two insulated counter-pressure strips 28 and 29 lying opposite the contact surfaces 31 and 32 respectively of the electrodes. The strips 28 and 29 have surfaces 33 and 34 which project at right angles with respect to the contact surfaces 31 and 32 respectively of the electrodes. These counter-pressure strips 28 and 29 are on the one hand elastically displaceable under the action of the electrode pressure V, and are on the other hand displaceable relative to one another in the direction H in order to press together the two upturned edges 23 and 24 of the sheets. The sheet ends 21 and 22 introduced into this welding apparatus take up at first the position shown in FIGURE 4. The facing side surfaces of the two upturned edges 23 and 24 are pressed together at contact surface 25 by the pressure H applied perpendicular to the electrode pressure V and with a pressure so high that the two upturned edges 23 and 24 form a contact surface 25 over the whole length of the upturned edges 23 and 24, which guarantees a uniform current path. After this compression in the direction H, the electrodes 26 and 27 are then forced against the sheet ends 21 and 22 in the direction V, while through the strips 28 and 29 a corresponding reaction is produced. While maintaining the pressure force in the direction H, the current impulse necessary for the production of the required welding heat is then passed through the sheet ends 21 and 22 by means of the electrodes 26 and 27. The current flow through the sheets is indicated by the flow lines 35, the current appearing at the contact surface 25 and a relatively small current density appearing here, since the contact resistance at this surface 25 (especially with tinned sheets) is small. At the iron edges *a* and *b* of the upturned edges 23 and 24 practically no current flow takes place, since these edges on account of their line contact produce a large resistance in comparison with the contact surface 25. By reason of this current flow shown by the flow lines 35 the welding heat occurs not at the edges *a* and *b* but much more at the contact surface 25, so that the welding heat does not influence the outer sides 21*a* or 22*a* of the sheets lying opposite the edges *a* and *b* and thus no melting of the tin occurs at these places.

After supplying the current impulse and the welding heat produced by it, the upturned edges 23 and 24 are pressed together by the action of the electrode pressure V and thereby the sheet ends are connected by press-welding so that a weld seam 36 (FIGURE 6) is produced. This weld seam possesses over its whole cross-section and longitudinal section a very uniform structure. There is thus produced with the welding process according to the invention a very firm and secure weld seam.

Figure 5:
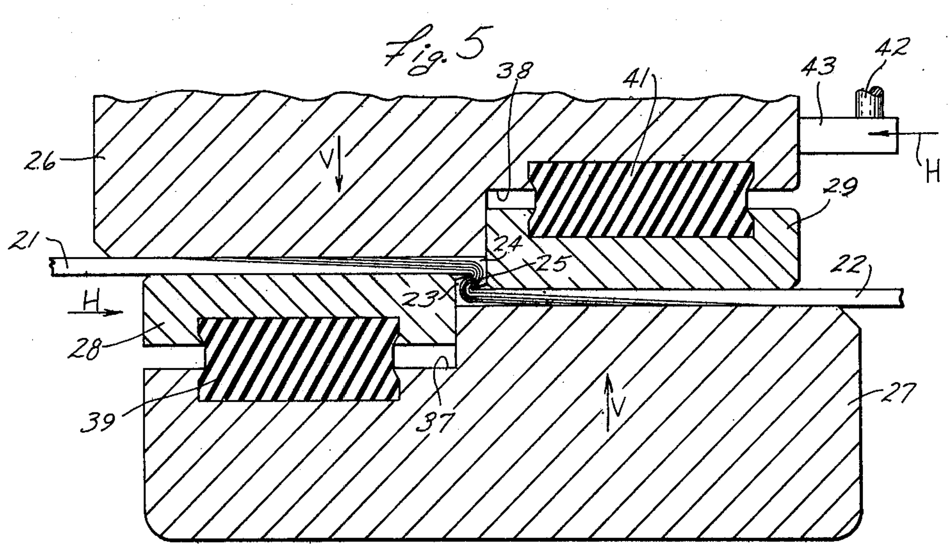
FIGURE 5 illustrates the constructional details of the resistance-welding apparatus according to FIGURE 4 at the beginning of the welding operation.
Figure 6:
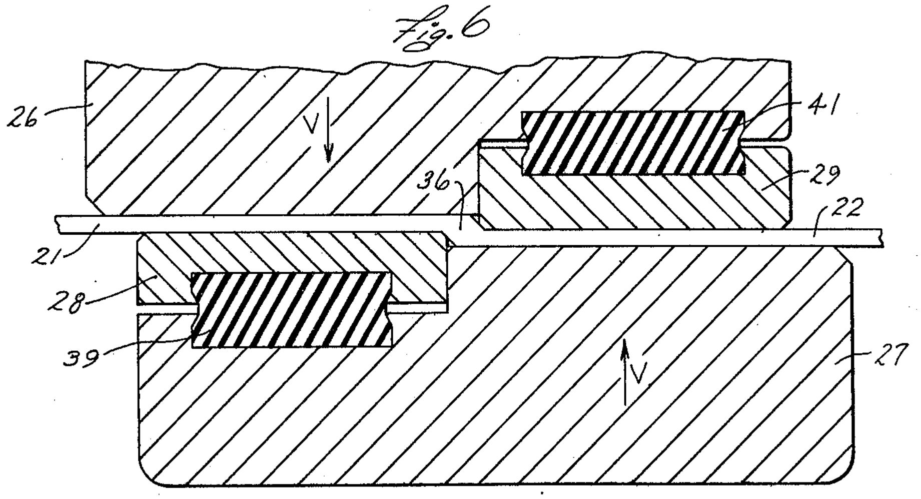
FIGURE 6 illustrates the welding apparatus of FIGURE 5 after the completion of the welding operation.

The welding apparatus can advantageously be constructed in accordance with FIGURES 5 and 6. Here each counter-pressure strip 28 or 29 is arranged in a recess 37 or 38 in the adjacent electrode 27 or 26, respectively. Each counter-pressure strip is connected to the adjacent electrode by a member 39 or 41 of elastic insulating material (for example, rubber of appropriate hardness). This elastic member 39 or 41 can advantageously have the cross-sectional shape and arrangement apparent from the drawing. By means of these members 39 and 41 an elastic reaction to the electrode pressure V is produced with the strips 28 and 29, these counter-pressure strips being displaceable somewhat in the direction V. On the other hand, these elastic connecting members 39 and 41 make possible the relative pressing together of the counter-pressure strips 28 and 29 in the direction H. The end position of the above-described parts of the welding apparatus is apparent from FIGURE 6.

In carrying out the welding process in accordance with the invention, the two upturned edges can first be pressed against one another with a greater compression pressure $H_{st}$, thereby to straighten the upturned edges 23 and 24 or to produce contact between these two edges over all the surface 25. This higher compression pressure is, before the current impulse, reduced to a considerably smaller contact pressure $H_k$, which is of advantage especially with tinned sheet in order to avoid the use of too great current strengths. The electrode contact pressure $V_k$ used before the current impulse can be increased after the current impulse to the electrode press-pressure $V_p$ for the production of press-welding. In this manner the electrode contact pressure or also the compression pressure can amount to a multiple of the contact pressure H used on the upturned edges 23 and 24.

In the following, an example is given for carrying out the welding of the upturned sheet ends of a tinned sheet with a sheet thickness of 0.25 mm. The contact length for each electrode is about 50–60 mm. The contact width B of the electrodes is some 5 to 6 mm. For the welding alternating current with a voltage of 5 volts and a current strength of 20,000 amperes per electrode is used, while the current impulse (up to the maximum) only operates some 0.06 to 0.08 sec.

The two upturned edges 23 and 24 are pressed against each other with a contact pressure $H_k$ of some 4 kg./cm. of seam length. A compression pressure of $H_{st}$ of some 20 kg./cm. can be used before this. Before the current impulse a perpendicular electrode pressure $V_k$ of some 12 kg./cm. is used. After the current impulse the electrode pressure is advantageously raised to a press pressure $V_p$ of some 16 kg./cm. for the production of the press-welding. The two upturned edges 23 and 24 are thus, as appears from FIGURE 6, pressed together in the direction V, while the counter-pressure strips 28 and 29 give way with the action of the elastic elements 39 and 41 so that the pressure $H_p$ during the press-welding is less than the above-mentioned contact pressure $H_k$.

Figure 7:
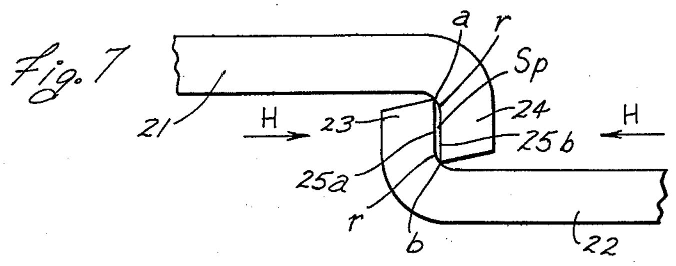
FIGURE 7 illustrates a further embodiment of the upturned sheet margins.

If the upturned edges 23 and 24 are not bent sharply at right angles but as in FIGURE 7 possess a certain rounding *r*, the operation sought for by the process in accordance with the invention can still be produced in this case. In the pressing together of the upturned edges 23 and 24 in the direction H the edges *a* and *b* will slide on the roundings *r* until the faces 25*a* and 25*b* of the upturned edges 23 and 24 lie against one another in surface contact. If neveretheless the space indicated in FIGURE 7 by $S_p$ is present, the edges *a* and *b* immediately become so soft through the heating when the current impulse is applied that the faces 25*a* and 25*b* then immediately through the pressure H lie against one another as one surface as in FIGURE 4 and the current impulse then passes in the above-described manner through the contact surface 25 and generates the welding heat.

In the advantageous embodiment shown in FIGURES 5 and 6 the lower electrode 27 can be fixed and the upper electrode 26 can be displaceable in both vertical and horizontal directions. The above-mentioned horizontal force H is then produced by a mechanical pressure apparatus acting against the side of the electrode 26. This pressure apparatus can for example consist of an eccentric 43 arranged on a vertical axis 42.

A further advantageous embodiment of the process of the invention is discussed in connection with FIGURES 8 and 9. Accordingly, the sheet ends 51 and 52 are first bent at an angle $\alpha$ which is greater than 90° and is, for example, approximately 110°. According to FIGURE 8, both sheet ends are then overlapped or are hooked together by the edges 53 and 54. Pulling or tension forces Z then act on the sheet ends 51 and 52 such that both edges 53 and 54 are bent back to an angle $\alpha$, of approximately 90° (FIGURE 9), whereafter, in the above-described manner, the welding is done by two welding electrodes 56 and 57 whereby the two electrodes carry out the contact pressure for the current impulse and then the press-welding pressure in direction V.

If the two sheet ends 51 and 52 form the ends of a can body, the tension forces Z can be produced in a simple manner by spreading the free edges of the can body apart as will be described hereinafter.

Figure 9:
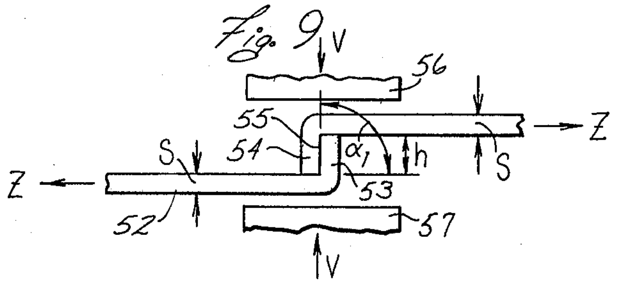

The performance of the process of the invention according to FIGURES 8 and 9 has many advantages or functions. If, according to FIGURE 8, the edges 53 and 54 are bent at an angle $\alpha$ exceeding 90°, and after overlapping of the sheet ends, the effect of tension forces Z causes a hooking together of the edges 53 and 54 as illustrated in FIGURE 8. This hooking together causes the edges 53 and 54 to be in mating relationship at all times across the entire height *h*, and thus across the entire contact surface 55. A contact surface 55 which has the same size at all times is an important condition for the uniform passage of current and thus a requirement for always obtaining a good and uniform welding seam.

Further, the surface pressing which is required for the passage of current and which is uniform over the length and height of the edges 53 and 54 is achieved at contact surface 55 by means of the tension forces Z. Furthermore, the edges 53 and 54 are bent back to the angle $\alpha$, of approximately 90° by the tension forces Z, that is, the edges 53 and 54 are brought into the correct welding position according to FIGURE 9 wherein both edges 53 and 54 are positioned in a direction which substantially corresponds to the direction V of the electrode pressure. When both edges 53 and 54 are at an inclined position with respect to the direction V of the electrode pressure, namely, the angle $\alpha$, deviates from 90°, the danger exists that the electrode pressure V can cause the edges 53 and 54 to tilt to one or the other side which is undesirable because the compression of the edges 53 and 54 must occur in direction V to obtain a good welding seam.

The height $h$ of the edges 53 and 54 is preferably about two to three times the sheet thickness $s$. If this height is less, the manufacture of the edges is difficult due to the high worktool wear. On the other hand, if a greater height is chosen, not only a welding seam which is too strong is produced but also the danger of the above-mentioned tilting of the relatively long edges 53 and 54 during the welding pressure V exists.

Figure 10:
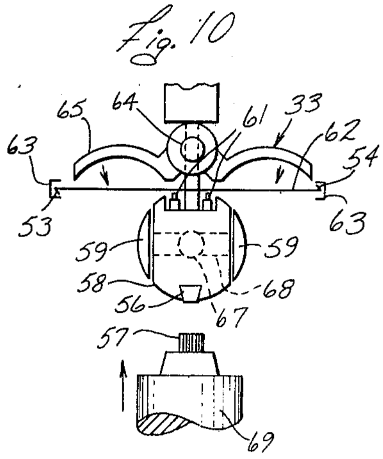
FIGURE 10 is a front view of a bending and welding apparatus to manufacture cylindrical can bodies according to the process which is schematically illustrated in FIGURES 8 and 9.
Figure 11:
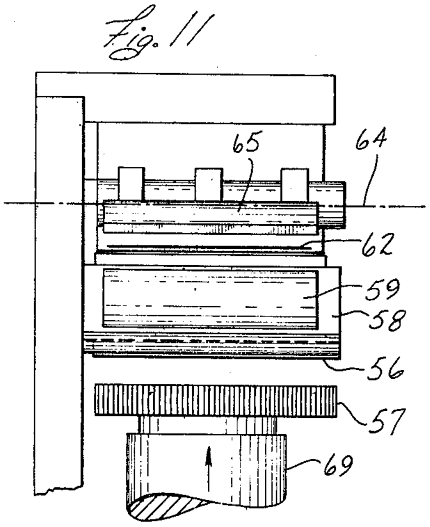
FIGURE 11 is a side-elevational view of FIGURE 10.
Figure 12:
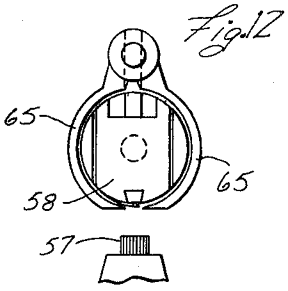
FIGURES 12 to 14 illustrate various operating positions of the parts of FIGURE 10.
Figure 13:
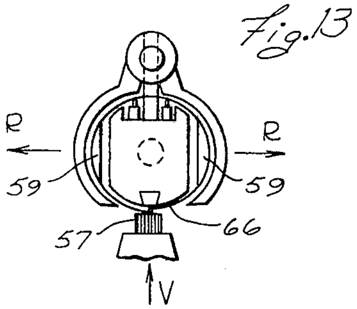
Figure 12A:
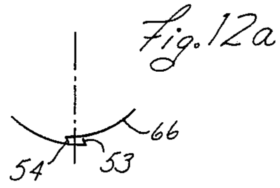
FIGURE 12*a* illustrates the sheet ends in the operating position of FIGURE 12.
Figure 14:
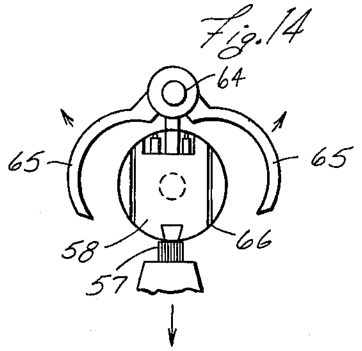

The apparatus of FIGURES 10 and 11 which uses the above-described process of FIGURES 8 and 9 and which is used to manufacture welded can bodies includes a stationary, horizontal, cylindrical mandrel 58 which, at its periphery, has radially movable spreading jaws 59. A feed means, for example a feed rod 61 is provided for moving a plane sheet of material 62 in a horizontal position over the mandrel 58, the sheet being bent at both ends. Two curved bending jaws 65 are pivotally mounted about a common axis 64 which is positioned above the mandrel. The radius of curvature of said bending jaws 65 corresponds to the radius of curvature of the mandrel 58. An upper welding electrode 56 is arranged in the lower part of the mandrel 58 and extends longitudinally therealong. A lower welding electrode 57 is arranged underneath said welding electrode 56 and extends in the same direction and is movably mounted so as to vary the height thereof. In operation, the sheet 62, the two ends of which have been bent at an angle $\alpha$ of greater than 90° (as illustrated in FIGURE 8), is moved by means of the feed rod 61 into a position above the mandrel 58 as illustrated in FIGURE 10. The sheet is guided at both ends in guide rails 63 having a U-shaped profile. Both bending jaws 65 are then moved downwardly about the axis 64 in the direction of the arrow (FIGURE 10) so that the sheet 62 is bent around the mandrel 58 as shown in FIGURE 12. At the end of this bending process, the sheet ends of the can body 66 overlap so that both edges 53 and 54 are in the position illustrated in FIGURE 12*a*. The can body 66 is then spread apart by oppositely moving both spreading jaws 59 radially in direction R (FIGURE 13). During this spreading process, both edges 53 and 54 are hooked together (FIGURE 8) and tensile forces Z then act on the sheet ends (compare FIGURE 9), which tensile forces effect a bending back of the edges 53 and 54 to the angle $\alpha$, of substantially 90° (compare FIGURE 13*a*). For spreading apart the jaws 59, a longitudinally movable rod 67 is provided in the mandrel 58 (FIGURE 10) with wedge-shaped parts 68 being positioned on opposite sides of said rod, which parts press both jaws 59 apart in direction R during movement of the rod 67.

Figure 15:
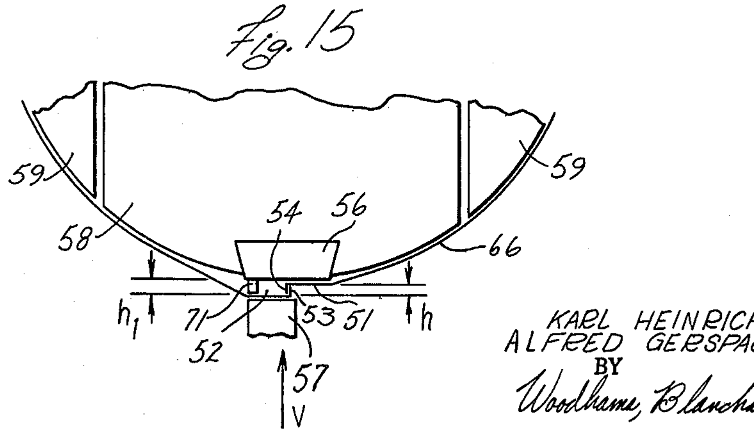
FIGURE 15 illustrates the sheet ends in the operating position of FIGURE 13 with a special structure for the upper welding electrode.
Figure 13A:
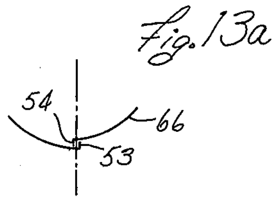
FIGURE 13*a* illustrates the sheet ends in the operating position of FIGURE 13.

When the operating position according to FIGURE 13 and FIGURE 13*a* is achieved, then the lower welding electrode 57 is moved upwardly in direction V, for example, by a piston 69, and the welding then takes place in the above-described manner. The upper welding electrode 56 can, as illustrated in FIGURE 15, be provided on one side with a support bar 71 projecting over the contact surface, said support bar being made of an insulating material (preferably an elastic insulating material), the height of which $h_1$ corresponds approximately to the height $h$ of the edges. Thus, it is achieved that both edges 53 and 54 are brought into contact after hooking in such a way that they are in positive and abutting mating relationship over the entire contact surface 55 (FIGURE 8) and are then bent back to 90° under the effect of the tensile forces Z into the desired welding position illustrated in FIGURE 9.

Although a particular preferred embodiment of the invention has been described above in detail for illustrative purposes, it will be recognized that variations or modifications of such disclosure, which lie within the scope of the appended claims, are fully contemplated.

The embodiments of the invention in which an exclusive property or privilege is claimed are defined as follows:

1. An electrical resistance process for forming a welded seam between overlapping metal sheets, which comprises bending the edges to be seamed with said edges being bent substantially at right angles to said metal sheets, overlapping the bent edges and positioning the bent edges adjacent one another with the adjacent side surfaces thereof in positive abutting contact with each other, positioning the overlapped edges between two electrodes with both of said electrodes extending the entire length of the seam to be welded, pressing said electrodes against said overlapped edges in the direction of the bent edges, and passing current through the electrodes and the edges to produce a welded seam.

2. An electrical resistance process for forming a welded seam between overlapping metal sheets, which comprises bending the edges to be seamed with said edges being bent substantially at right angles to said metal sheets and having a height at least approximately equal to the thickness of the metal sheets, overlapping the bent edges and positioning the bent edges adjacent one another with the adjacent side surface thereof in positive abutting contact with each other, positioning the overlapped edges between two electrodes with both of said electrodes extending the entire length of the seam to be welded, and passing current through the electrodes and the edges with the current passing through the contacting adjacent side surfaces to produce a welded seam therebetween.

3. An electrical resistance process for forming a welded seam between overlapping metal sheets, comprising the steps of bending the edges to be seamed with said edges being bent substantially at right angles to said metal sheets, overlapping the bent edges and positioning the edges adjacent one another with the adjacent surfaces thereof in positive abutting contact with each other, positioning the overlapping edges between two electrodes with both of said electrodes extending the entire length of the seam to be welded, pressing the adjacent surfaces of said bent edges toward one another and maintaining a pressure on said adjacent surfaces for maintaining same in positive abutting contact during the welding operation, pressing said electrodes against said overlapping edges in a direction substantially transverse to the direction of pressure applied to said adjacent surfaces, and passing current through the edges to produce a welded seam.

4. Electrical resistance welding apparatus for forming a welded seam between overlapping metal sheets wherein the metal sheets are provided with bent edges thereon substantially at right angles to the sheets with the edges overlapping and being adjacent one another in positive mating relationship, said device comprising first and second welding electrodes extending over the entire length of the seam to be welded, the electrodes being positioned on opposite ends of said adjacent bent edges, and means for maintaining the adjacent surfaces of the overlapping bent edges in abutting contact with each other, said means for maintaining the adjacent surfaces of the overlapping edges in abutting contact with each other applying a force to said adjacent surfaces for maintaining same in positive contact with each other.

5. Electric resistance welding apparatus as defined in claim 4, wherein said electrodes are provided with transverse shoulders thereon with said shoulders facing one another when said first and second electrodes are positioned adjacent said bent edges, the confronting faces of said shoulders being positioned on opposite sides of said overlapped bent edges and in contact therewith for maintaining the adjacent surfaces of the overlapping bent edges in positive abutting contact with each other.

6. The process as defined in claim 1, wherein the free end of the bent edge of one of said metal sheets is positioned closely adjacent to and in contact with said other metal sheet when the bent edges are overlapped, the free end of said bent edge having an inclined front face so as to result in a substantial line contact with said other sheet, whereby the current will flow through the adjacent side surfaces due to the positive abutting contact therebetween so as to produce a welded seam between said adjacent side surfaces.

7. A process according to claim 3, wherein said adjacent surfaces are side surfaces and are maintained in positive abutting contact with each other by means of a clamping pressure applied to said bent edges in a direction substantially transverse to the electrode pressure.

8. A process as defined in claim 3, wherein the free end of the bent edge of one of said metal sheets is positioned closely adjacent to and in contact with said other metal sheet when the bent edges are overlapped, the free end of said bent edge having an inclined front face so as to result in a substantial line contact with said other sheet, whereby the current will flow through the adjacent side surfaces due to the positive abutting contact therebetween so as to produce a welded seam between said adjacent side surfaces.

9. An electrical resistance process for forming a welded seam between overlapping metal sheets, which comprises bending the edges to be seamed with said edges being bent substantially at right angles to said metal sheets, overlapping the bent edges and positioning the bent edges adjacent one another with the adjacent surfaces thereof in positive abutting contact with each other, positioning the overlapped edges between two electrodes with both of said electrodes extending the entire length of the seam to be welded, pressing said electrodes against said overlapped edges in the direction of the bent edges, applying a clamping pressure to said bent edges so as to place the adjacent surfaces thereof in positive abutting contact, said clamping pressure being applied in a direction substantially transverse to the electrode pressure, passing current through the electrodes and the edges to produce a welded seam, and further pressing said electrodes against said overlapped edges after the current has passed therethrough for press-welding the edges together.

10. The process as defined in claim 9, wherein the sheet bent edges are sharply bent at right angles.

11. The process as defined in claim 9, wherein the bent edges are turned up to a height which is greater than the thickness of the sheet but less than double the said thickness.

12. The process as defined in claim 9, wherein the adjacent surfaces of the bent edges are first pressed together with a substantially large clamping pressure and, before the current is applied to said edges, said clamping pressure is reduced to a considerably smaller contact pressure.

13. The process as defined in claim 12, wherein the electrode contact pressure, after the current passes through said edges, is increased to achieve the press-welding.

14. The process as defined in claim 12, wherein the electrode pressure and the large clamping pressure is a multiple of the smaller contact pressure acting onto the edges during current passage therethrough.

15. The process as defined in claim 9, wherein the electrode contact pressure, after the current passes through said edges, is increased to achieve the press-welding.

16. Electrical resistance welding apparatus for forming a welded seam between overlapping metal sheets wherein the sheets are provided with bent edges thereon with the edges overlapping and being adjacent one another, comprising two welding electrodes arranged in opposition and shifted sidewise with respect to each other, said electrodes being constructed to engage the sheet ends over the greater breadth and to extend up to the bent edges, two counter-pressure strips lying opposite the contact surfaces of the electrodes and constructed to project beyond the contact surface of the adjacent electrode, and means mounting said strips for elastic displacement by the electrode pressure and for relative mutual displacement to press together the bent edges of the sheets.

17. A welding apparatus as defined in claim 16, wherein each electrode has a recess therein in which one of the counter-pressure strips is located, and said mounting means comprising members of elastic insulating material connecting each of said strips to its electrode.

18. An electrical resistance welding process for forming a welded seam between overlapping metal sheet ends, which comprises the steps of bending the edges to be seamed with said edges being bent through an angle exceeding 90°, overlapping the bent edges and positioning the bent edges adjacent one another, applying a force to said sheet ends for causing the adjacent surfaces of said bent edges to positively contact one another and to bend the bent edges back to an angle of approximately 90° relative to said sheet ends, positioning said bent edges between a pair of electrodes, and passing a current through the electrodes and the edges for welding said edges together.

19. A process as defined in claim 18, wherein a single metal sheet is provided with the opposite edges thereof being bent, said sheet comprising the body of a container with said force causing said body to enlarge whereby the overlapped edges are drawn tightly together.

20. A process as defined in claim 15, wherein both sheet ends are initially bent at an angle of approximately 110°.

21. A process as defined in claim 18, wherein said force is a tensile force applied to each of said sheet ends tending to separate same.

References Cited

UNITED STATES PATENTS

| | | | |
|---|---|---|---|
| 442,484 | 12/1890 | Jensen | 228—15 |
| 655,304 | 8/1900 | Midgley | 29—482 |
| 1,220,774 | 3/1917 | Murray | 219—105 X |
| 1,332,932 | 3/1920 | Sussman | 29—482 X |

FOREIGN PATENTS

| | | |
|---|---|---|
| 722,502 | 1/1955 | Great Britain. |

JOSEPH V. TRUHE, Primary Examiner

B. A. STEIN, Assistant Examiner

U.S. Cl. X.R.

219—105, 117